United States Patent

Hahn et al.

[11] 3,856,634
[45] Dec. 24, 1974

[54] METHOD FOR MEASURING DISSOLVED OXYGEN IN AQUEOUS SOLUTION USING TUNGSTEN BRONZES AS A POTENTIOMETRIC INDICATING ELECTRODE

[75] Inventors: Paul B. Hahn; Dennis C. Johnson; Howard R. Shanks, all of Ames, Iowa; Margaret A. Wechter, Hammond, Ind.

[73] Assignee: Iowa State University Research Foundation, Inc., Ames, Iowa

[22] Filed: Mar. 19, 1973

[21] Appl. No.: 342,682

[52] U.S. Cl. ............................. 204/1 T, 204/195 M
[51] Int. Cl. ........................................... G01n 27/46
[58] Field of Search ............ 204/1 T, 195 M, 195 R

[56] References Cited
UNITED STATES PATENTS
3,431,182   3/1969   Frant................................. 204/1 T

OTHER PUBLICATIONS

Wechter et al., "Anal. Chem.", vol. 44, No. 4, April, 1972, pp. 850–853.

Primary Examiner—T. Tung
Attorney, Agent, or Firm—Dawson, Tilton, Fallon & Lungmus

[57] ABSTRACT

Tungsten bronzes, which are nonstoichiometric compounds having a general formula $A_xWO_3$ where $x$ is a value greater than zero and less than one, have been found to respond potiometrically to dissolved oxygen in basic solutions. A Nerstian type response, with a slope of approximately 120 mV. per decade, is observed in the concentration range 0.2 – 8 ppm.

7 Claims, 6 Drawing Figures

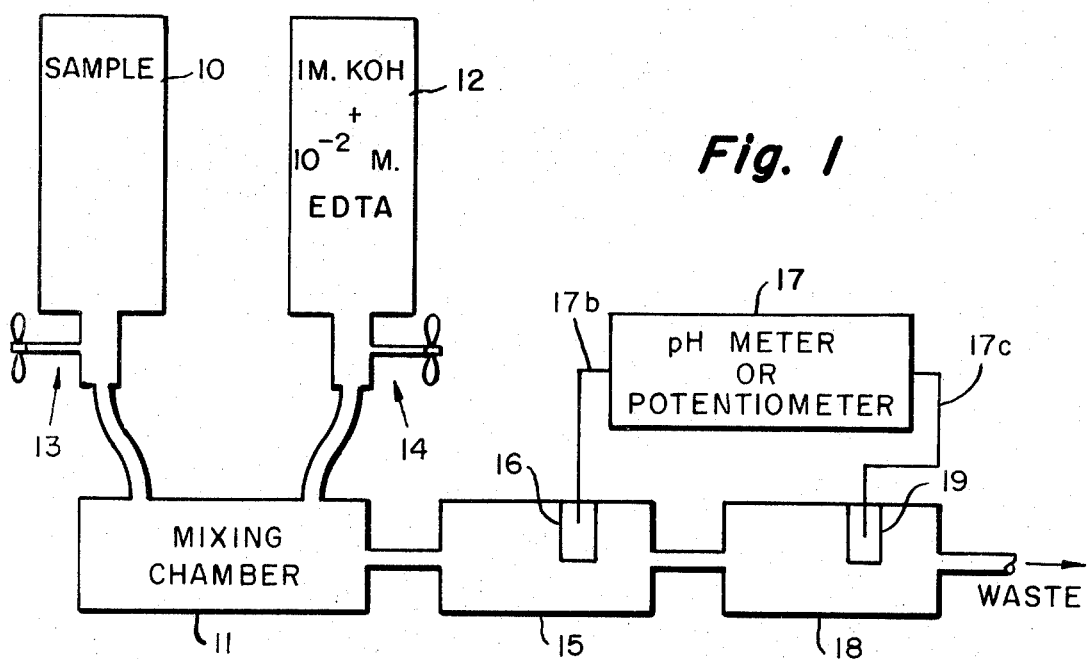
Fig. 1
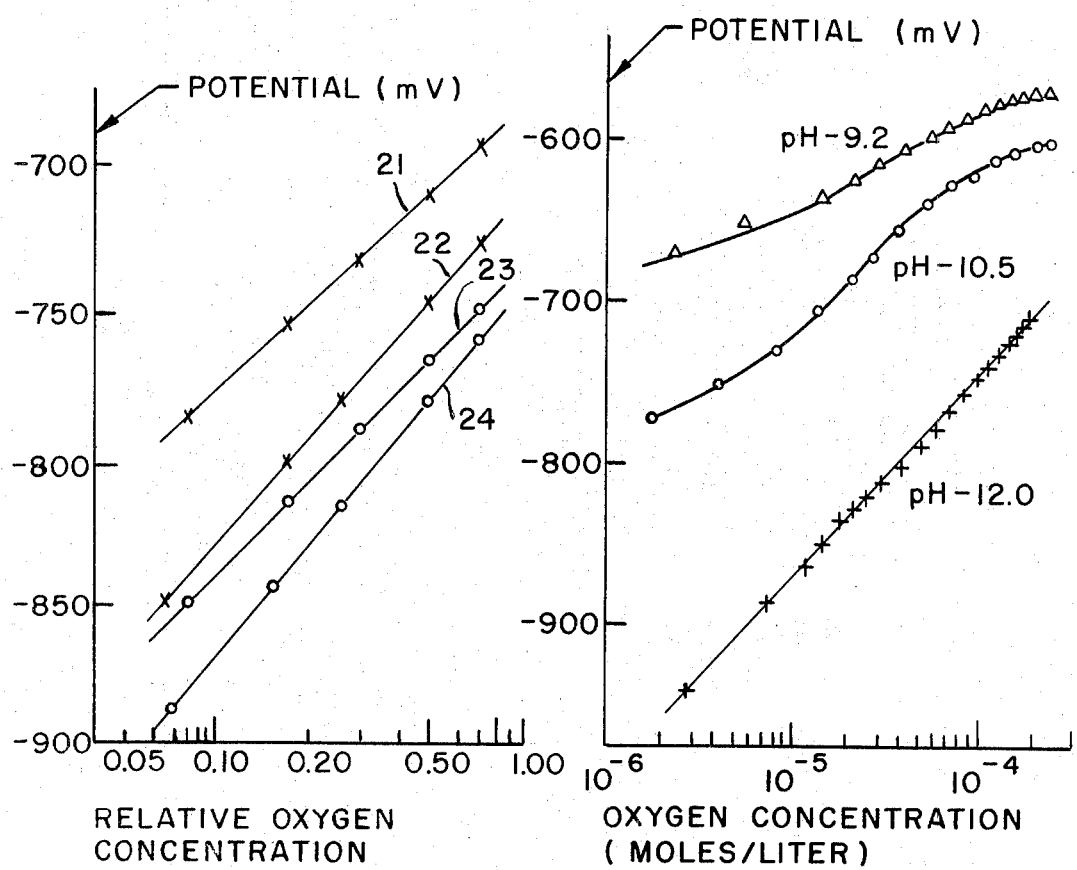
Fig. 2
Fig. 3

3,856,634

METHOD FOR MEASURING DISSOLVED OXYGEN IN AQUEOUS SOLUTION USING TUNGSTEN BRONZES AS A POTENTIOMETRIC INDICATING ELECTRODE

BACKGROUND AND SUMMARY

The invention described herein was made in the course of, or under, a contract of the United States Atomic Energy Commission.

The present invention relates to a system and method for measuring dissolved oxygen in aqueous solution.

Electrochemical methods are known for measuring dissolved oxygen in aqueous media. Such methods are either polarographic or galvanic in that oxygen concentration is determined by applying a constant electric potential between two electrodes and measuring the resultant current as representative of the concentration of dissolved oxygen. Further, the utility of sodium tungsten bronzes, highly conducting nonstochiometric compounds of the formula $Na_xWO_3$ as potentiometric indicating electrodes for specific ions has been disclosed by Wechter, et al. in an article appearing in ANALYTICAL CHEMISTRY, Vol. 44, p. 850 (1972). The use of tungsten bronzes as active elements in ion-selective electrodes has also been disclosed in copending application Ser. No. 226,862, of Wechter and Shanks entitled "Ion-Selective Electrodes Using Tungsten Bronzes as Active Element," filed Feb. 16, 1972. In the Wechter, et al. publication and in the referenced application, it was shown that the potential difference between a tungsten bronze electrode and a conventional reference electrode is indicative of the concentration of certain reducible metals. Further, their utility in acid-base and redox titrations was disclosed. Tungsten bronze electrodes have also been proposed by others as fuel cell electrodes because of their strong catalytic effect on the reduction of oxygen.

The present invention uses tungsten bronzes (and preferably cubic sodium tungsten bronze wherein $x$ is greater than 0.5 and less than 0.9) as an electrode for the potentiometric determination of dissolved oxygen concentration in basic aqueous solution. The method differs from the above-referenced electrochemical methods for determining dissolved oxygen in aqueous media in that a potential or voltage, rather than a current, is representative of the oxygen concentration.

We have found that the bronze electrodes show a Nernstian type response over an oxygen concentration range of 0.2 to 8 ppm. and a useful range down to approximately 0.1 ppm. Over this range the slope of a plot of the potential v. log concentration is surprisingly large, approximately 120mV/decade. The electrodes of the present invention are useful in the field of instrumentation for analysis of surface or waste water for dissolved oxygen.

The mechanism for the response of the tungsten bronze electrode to dissolved oxygen in basic solution is not immediately apparent. A number of observations, however, have suggested that either (1) the adsorption and desorption of oxygen and anions, especially $OH^-$, at the electrode surface play an important role in the potentiometric response, or (2) the response is the result of a mixed potential developed at the bronze electrode involving the spontaneous reduction of oxygen and oxidation of $Na_xWO_3$. In postulating these mechanisms, we do not intend to limit our invention in any way.

Other features and advantages will be apparent to persons skilled in the art from the following detailed description of a preferred embodiment accompanied by the attached drawing.

THE DRAWING

FIG. 1 is a functional block diagram of a system for measuring the dissolved oxygen concentration of a sample incorporating the present invention;

FIG. 2 is a plot of test results relating electrical potential with relative oxygen concentration;

FIG. 3 is a plot similar to FIG. 2 but at different ph values;

DETAILED DESCRIPTION

Figure 4:
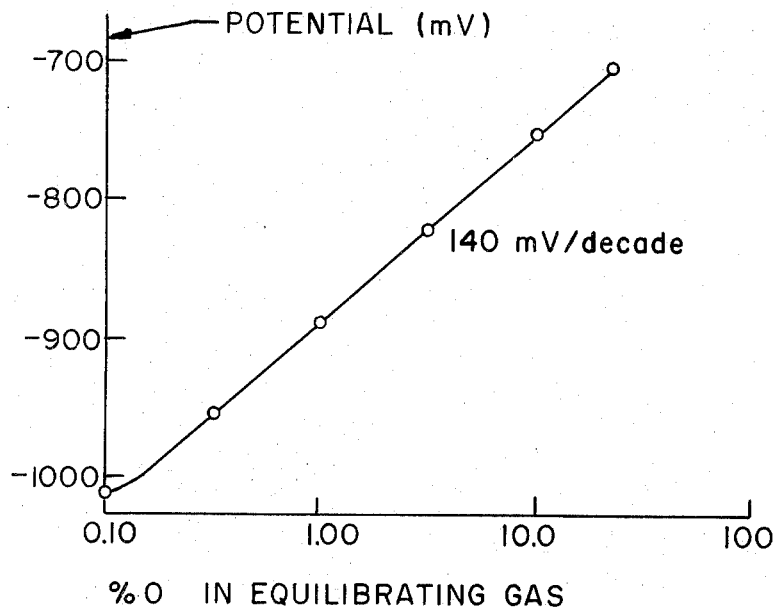
FIG. 4 is a plot of electrical potential v. per cent oxygen saturation.

Referring first to FIG. 1, there is shown a functional block diagram of a system which could be employed in the practice of the present invention when it is desired to have a continuous flow of the sample, the oxygen concentration of which is being measured.

Reference numeral 10 generally designates a reservoir holding a quantity of the sample which is fed under gravity or by mechanical pumping into a mixing chamber 11. Reference numeral 12 designates a reservoir for a deaerated or $N_2$ saturated basic solution or reagent solution which may include one M KOH with $10^{-2}$ M EDTA (disodium). the deaerated basic solution held in the reservoir is also fed into the mixing chamber 11 by either gravity, mechanical pumping or by nitrogen gas pressure or other equivalent means; however, the flow rate of the sample is adjusted, by means of a valve 13 so that it is approximately ten times that of the flow rate of the basic solution which has its flow rate adjusted by means of the adjustable valve 14. The sample and the basic solution are mixed in the mixing chamber 11 and then fed to a chamber 15 which houses the measuring bronze electrode 16. The bronze electrode 16 is connected to one terminal of a pH meter or potentiometer 17 by means of a conductor 17b.

After leaving the measuring electrode chamber 15, the mixture passes through a reference electrode chamber 18 which houses a conventional reference electrode 19, such as a saturated calomel electrode (SCE). The reference electrode 19 is connected to the other terminal of the pH meter 17 by means of a conductor 17c.

The mixture may be discarded after exiting the reference electrode chamber 18.

In the illustrated embodiment, mixing is achieved primarily through turbulence and diffusion in the mixing chamber 11. Mechanical means could be added to achieve greater mixing. Further, it is preferred that the measuring electrode chamber 15 have a small volume so as to achieve a rapid flow across the face of the electrode, for reasons which will become clear below. Alternatively, if mechanical pumping were employed to introduce the sample into the mixing chamber it would not be necessary to have the sample flow under gravity from the reservoir 10. Nitrogen gas is bubbled through the reservoir to deaerate the basic (or reagent) solution. Other inert gases including helium or argon could also be employed. The operation of the system of FIG. 1 will be further discussed below.

We have discovered that nonstoichiometric tungsten bronzes with the formula $A_xWO_3$, where $x$ has a value disclosed in more detail within, are useful in measuring dissolved oxygen concentration. The word "bronze" as used herein refers to a group of nonstoichiometric compounds of the general formula $A_xBO_3$. Tungsten bronze refers to $A_xWO_3$. These bronzes are different from, and have no connection with the classical "bronze" metals based on copper alloys. In general, the values of $x$ for the tungsten bronzes are substantially continuously variable from a value greater than zero and less than one. Several different crystal structures are observed in the system, however, such as cubic, tetragonal, hexagonal and orthorhombic. The structure observed depends upon the value of $x$ for the composition of a given crystal.

The crystals may be grown according to the technique disclosed in the above-identified Wechter and Shanks application Ser. No. 226,862.

For most of our tests and experiments, we used crystals of sodium tungsten bronze, $Na_xWO_3$, for the measuring electrodes 16, and we prefer such crystals. These crystals were grown by the electrolysis of a melt of $Na_2WO_4$ and $WO_3$ and analyzed for the $x$ value by neutron activation analysis or the measurement of lattice parameters. Individual electrodes were prepared from pieces either chipped or cut with a diamond saw from single larger crystals to provide a smooth or regular measuring surface for contacting the mixture. Some of the crystals were polished to a mirror-like surface and others were annealed at 650°C. in an argon atmosphere for about 48 hours and cooled at a rate of 50°/hr. to insure homogeneity.

The electrodes themselves were prepared by cementing the crystals to glass tubing with Elmers epoxy compound and making electrical contact through a mercury pool to a cooper wire. Alternative electrode constructions could equally well be employed.

All solutions used were prepared from reagent grade chemicals and deionized water; no attempt was made to prepare carbonate free basic solutions. Gases used for oxygen equilibration were dry 99.995% nitrogen and 99.6% oxygen, Matheson "Zero" grade air and specific oxygen-nitrogen mixtures (10.12, 3.27. 0.99, 0.35, and 9.10% $O_2$ by volume) prepared and analyzed ($\pm$ 2% relative) by Matheson Gas Products.

Potential measurements for the device 17 were made either with a Beckmen Zeromatic SS-3 pH meter or a Kiethley Model 640 vibrating capacitor electrometer. The output from these was fed into a Sargent Model MR recorder to monitor electrode response as a function of time. All potential measurements were made vs a saturated calomel reference electrode 19.

Three separate techniques were employed to establish or independently measure the concentrations of dissolved oxygen. The first was by mixing varying volumes of nitrogen saturated and oxygen saturated solutions and calculating the relative oxygen concentration on the basis of the volumes, assuming no loss of dissolved gases upon mixing. In the second, air or oxygen and nitrogen were purged into solution at varying rates and the dissolved oxygen concentration was determined voltammetrically with a conventional rotating platinum disc electrode.

The third technique made use of the pre-mixed $N_2$-$O_2$ gases described above to establish the oxygen concentration. This technique was easier, provided high stability in oxygen concentration over long periods of time, and was used in most of the experiments.

If the assumption is made that the Henry's Law constant for oxygen in pure water, $1.25 \times 10^{-3}$ moles/liter atm, applies as well in solutions of pH 9 – 13, the oxygen concentrations of the various solutions were as shown in Table 1. Except for air there would be an uncertainty of $\pm 2\%$ in these values based on the analyses provided with the gas mixtures.

Table I

| Gas, % | Oxygen Concentrations of Test Solutions Solution, M | Solution, ppm |
|---|---|---|
| 20.9 (air) | $2.6 \times 10^{-4}$ | 8.3 |
| 10.12 | $1.27 \times 10^{-4}$ | 4.07 |
| 3.27 | $4.1 \times 10^{-5}$ | 1.31 |
| 0.99 | $1.24 \times 10^{-5}$ | 0.40 |
| 0.35 | $4.4 \times 10^{-6}$ | 0.14 |
| 0.10 | $1.25 \times 10^{-6}$ | 0.040 |

The potentiometric response of the tungsten bronze electrode to dissolved oxygen in pH 12 or greater KOH solutions was found to be Nernstian like over a concentration range from air saturation to a factor of approximately 100 lower. FIG. 2 illustrates the oxygen responses of two $Na_xWO_3$ electrodes of $x$ value 0.62 (plots 21 and 22) and two of $x$ value 0.81 (plots 23 and 24) as determined using the dilution technique in a pH 12 solution (0.0387M KOH, 0.0161M KCl, $5 \times 10^{-4}$ M EDTA). The EDTA was the disodium salt and its principal function is to complex metal ions which might interfere with the measurement since the electrode is also sensitive to certain metal ions. Other complexing agents could be used.

FIG. 3 illustrates the oxygen response of an $x = 0.71$ sodium tungsten bronze electrode as a function of pH. In these determinations dissolved oxygen was measured independently by voltammetry.

Typical response curves for the annealed, flat surfaced crystals ($x = 0.65$) in 0.1M KOH, $10^{-3}$ M EDTA using the premised gases to establish a given $O_2$ concentration are represented in FIGS. 3 and 4. FIG. 4 is a series of time (abscissa) response curves showing the potential of the measuring electrode from the instant it was moved from an air saturated KOH solution into various solutions saturated at predetermined lower $O_2$ partial pressures, the lower pressures are indicated adjacent their respective curves.

Figure 5:
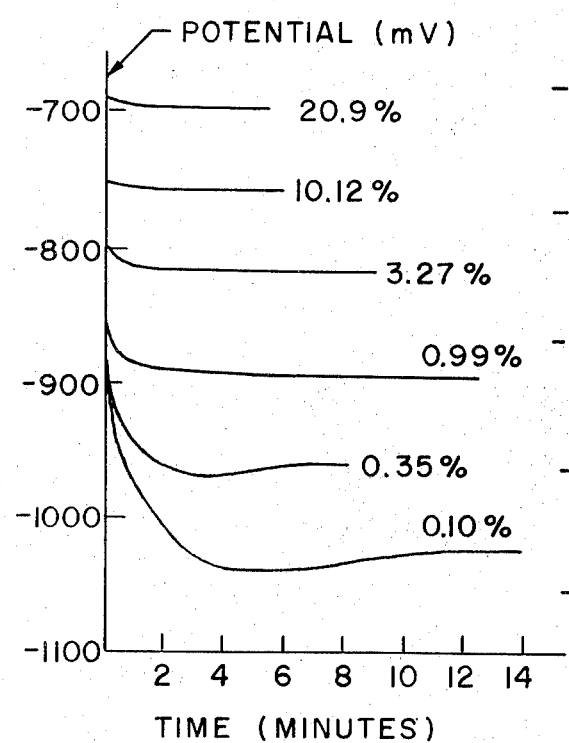
FIG. 5 is a family of graphs showing the time response of the inventive electrode for different values of dissolved oxygen concentration.

The slopes of plots of potential vs log oxygen concentration are extremely large in solutions of pH 12 or greater, ranging from approximately 90 to greater than 160 mV/decade, more frequently between 105 and 150 mV/decade as shown in FIGS. 2–4. The time response shown in FIG. 5 is also of interest. The electrode reached equilibrium potential in 2–3 minutes at higher oxygen concentrations ($P_{O_2} > 0.01$ atm), but at lower concentrations significantly longer time was required, and a minimum in the potential was observed before a stable value was reached.

Variations in the slopes of the response curves and the potential for an air saturated solution were found to be considerable. These variations were apparent not only between bronzes of differing $x$ values but also between electrodes cut or chipped from the same parent crystal. In fact, the variations in slope and potential for air for a given electrode appeared just as large when compared on consecutive days. As an example one electrode exhibited the following slopes over a three-day period: 163; 116; 131; and 105 mV/decade. The corresponding potentials for air saturated solutions were 641; 701; 702; and 678 mV.

Considerably more reproducible responses were seen with electrodes cut with flat surfaces and annealed than with non-annealed crystals with irregular surfaces. The former responded more rapidly and in general this response was Nernstian like to lower oxygen concentrations. A comparison of slopes and potential for air-saturated solutions is given in Table II. The only apparent difference in this comparison was lower variability in the air-saturated potential for the annealed electrodes.

Table II

Effect of Electrode Treatment

|  | Annealed, flat surface | Not annealed irregular surface |
|---|---|---|
| $x$ value | 0.65 | 0.61 |
| No. of electrodes | 16 | 8 |
| No. of observations | 20 | 15 |
| Average air intercept (mV) | $-695 \pm 22^a$ | $-712 \pm 42$ |
| Average slope (mV/decade) | $120 \pm 13$ | $124 \pm 14$ |

$^a$One standard deviation response of an electrode with $x = 0.62$ when plunged from an $O_2$ saturated solution to one freed of oxygen by nitrogen purging and back, illustrating the effect of EDTA at a concentration of 1 mM. The use of EDTA extended the range approximately 200 mV, corresponding to a factor of nearly 40 in oxygen concentration. However, concentrations of EDTA above $10^{-3}$M resulted in slow electrode response and excessive drift.

Temperature variations caused considerable change in potential of the $Na_xWO_3$ oxygen electrode. For an annealed, flat surface, $x = 9.65$ electrode equilibrated in 0.1M KOH - $10^{-3}$M EDTA with the 3.27% oxygen mixture, the temperature coefficient, $dE/dT$, was found to be $-7.04$ mV/°C over a temperature range extending from 3° to 35°C. Thus, for systems to be used under conditions of varying temperature, it may be desirable to add a temperature regulating means on the chambers 11, 15 and 18 of FIG. 1. For example, all three chambers could be immersed in a temperature-controlled water bath.

Sodium tungsten bronze electrodes which had regular surfaces and were annealed (as explained above) were found to perform very well in the analysis for dissolved oxygen over the range from air (20.9%) to 1% oxygen saturation (8 to 0.4 ppm). The results of 20 series of analyses using 16 of the annealed electrodes are presented in Table III.

Table III

Results of Oxygen Analyses

| Electrode | Date | Air intercept (mV) | Slope (mV/decade) | Measured $O_2$ partial pressure (% $O_2$ saturated) | | | |
|---|---|---|---|---|---|---|---|
|  |  |  |  | 10.12 | 3.27 | 0.35 | 0.10 |
| 680 | 7/26 | −689 | 119 | 9.76 | 3.40 | 0.295 | 0.068 |
| 681 | 7/26 | −689 | 105 | 9.54 | 3.21 | 0.306 | 0.087 |
| 681 | 7/27 | −718 | 116 | 9.81 | 3.55 | 0.295 | 0.081 |
| 682 | 7/26 | −690 | 118 | 9.95 | 3.30 | 0.286 | 0.072 |
| 683 | 7/26 | −705 | 110 | 10.07 | 3.06 | 0.283 | 0.106 |
| 685 | 7/26 | −678 | 118 | 10.91 | 3.22 | 0.317 | 0.092 |
| 686 | 7/27 | −700 | 123 | 10.91 | 3.22 | 0.281 | 0.072 |
| 690 | 8/03 | −698 | 116 | 10.05 | 3.73 | 0.397 | 0.061 |
| 690 | 8/03 | −708 | 126 | 10.80 | 3.50 | 0.303 | 0.064 |
| 690 | 8/04 | −711 | 117 | 9.85 | 3.27 | $0.255^a$ | $0.029^a$ |
| 691 | 8/04 | −717 | 159 | 9.65 | 3.05 | 0.384 | 0.108 |
| 691 | 8/08 | −664 | 131 | 9.76 | 3.25 | 0.253 | 0.067 |
| 692 | 8/08 | −622 | 96 | 9.81 | 3.12 | 0.323 | 0.077 |
| 693 | 8/07 | −695 | 133 | 9.88 | 3.36 | 0.283 | 0.086 |
| 694 | 8/07 | −678 | 128 | 9.84 | 3.24 | 0.258 | 0.065 |
| 695 | 8/07 | −712 | 111 | 9.55 | 3.04 | $0.425^a$ | $0.272^a$ |
| 696 | 8/07 | −717 | 123 | 10.73 | 3.69 | 0.298 | 0.065 |
| 697 | 8/07 | −700 | 108 | 9.86 | 3.23 | 0.273 | 0.084 |
| 698 | 8/08 | −696 | 113 | 10.26 | 3.50 | 0.249 | 0.053 |
| 699 | 8/07 | −707 | 119 | 10.14 | 3.40 | 0.325 | 0.103 |
| AVERAGE |  | −694.7 | 119.5 | 10.056 | 3.317 | 0.301 | 0.078 |
| 1 std. deviation |  | ±22.3 | ±12.9 | ±0.439 | ±0.199 | ±0.039 | ±0.016 |
|  |  |  |  | (4.4%) | (6.0%) | (13.1%) | (20.7%) |

$^a$Result discarded from statistical analysis

Bronzes having $x$ values in the range 0.60 - 0.65 appeared most satisfactory. Electrodes of lower $x$ value usually responded very slowly, and for those of higher $x$ value the calibration plots were often non-linear. As a medium for the oxygen response KOH appeared superior to both NaOH and LiOH.

Figure 6:
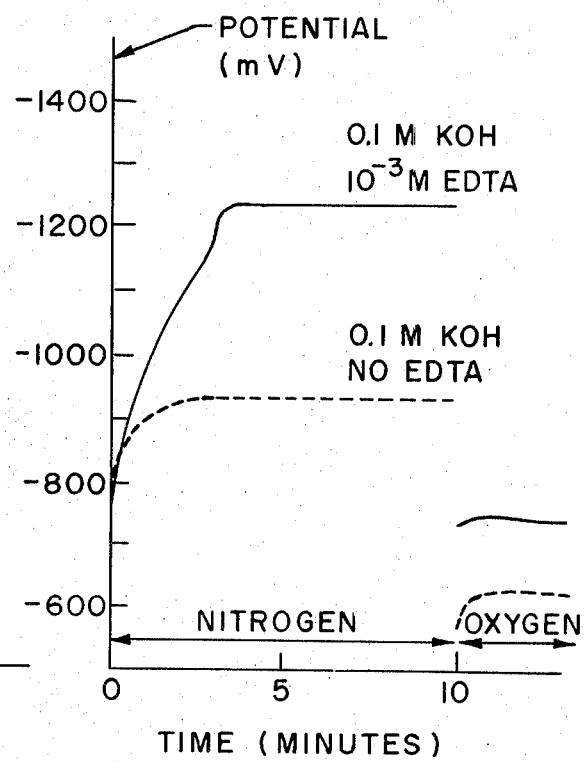
FIG. 6 is a plot of electrical potential as a function of time and showing the effect of EDTA on the time response of the electrode.

The addition of EDTA at a concentration of 0.5 to 1mM was found to facilitate the complexing of traces of interfering metals. Without the EDTA, oxygen response would hardly extend to 1 ppm. FIG. 6 shows the For each run the potential was measured in 0.1M KOH with $10^{-3}$M EDTA saturated sequentially with the six $N_2$-$O_2$ gas mixtures listed in Table 1. The potentials with air and 0.99% $O_2$ were used to provide a two-point calibration of the form, log $C = m(mV)$+constant, for analyses on solutions obtained with the other four mixtures.

Analyses at 10 and 3.3% showed no systematic error and had standard deviations of approximately 5%. The 0.35 and 0.10% analyses appeared to be systematically low with deviations of 14 and 21% respectively from the reported value and relative standard deviations of similar magnitude. Significant improvement in this range would be expected if calibrations were made with oxygen concentrations of the same order of magnitude as the unknown.

The slope of the calibration plot for an electrode had little or no bearing on the success of an analysis; results were similar for electrodes 691 and 692 with slopes of 159 and 96 mV/decade respectively.

Selectivity to oxygen was found to be good; potential shifts for the presence of Fe(III), Cu(II) and Hg(II) at various concentrations in an air saturated solution are presented in Table IV.

Table IV

Effect of Metal Ion Impurities

| Concentration of interfering ion | Potential shift (mV) | | |
|---|---|---|---|
| | Fe(III) | Cu(II) | Hg(II) |
| $1 \times 10^{-5}$M | +9 | +1 | 0 |
| $1 \times 10^{-4}$M | +13 | +5 | 0 |
| $5 \times 10^{-4}$M | +14 | +12 | 0 |
| $1 \times 10^{-3}$M | +16 | +16 | +6 |
| $2 \times 10^{-3}$M | +17 | — | — |
| $3 \times 10^{-3}$M | — | +68 | +32 |
| $5 \times 10^{-3}$M | +25 | — | — |

The maximum shift encountered at concentrations up to the EDTA concentration, $10^{-3}$M, was 16 mV on a 120 mV/decade scale. Minimal effect on an oxygen analysis is anticipated if the concentrations of such species are less than $10^{-3}$M and remain relatively stable during calibration and sample measurement.

In all oxygen measurements it was demonstrated that consistent and rapid stirring was advantageous in maintaining a stable potential. The potential of solutions which were unstirred drifted in the negative direction, and in the case of very dilute oxygen solutions it would stabilize at a value corresponding to a completely deoxygenated system, indicating a depleting of oxygen in the vicinity of the electrode surface.

The extremely large slope, 120 mV/decade, implies that the simple reduction of $O_2$ at the bronze surface is not the only role played in the response mechanism. The reduction of $O_2$ to $OH^-$ or $H_2O$ in basic solution requires four electrons per molecule resulting in a slope of 15 mV/decade, while reactions yielding peroxide would require two electrons yielding a 30 mV/decade slope.

The pH response of the $Na_xWO_3$ electrode for an annealed, $x = 0.65$ electrode in air saturated solutions using $HNO_3$ - KOH to adjust the pH have already been determined. These results suggest that the adsorption of ions at the bronze surface may be important in establishing the potential of the electrode. A number of anions, $F^-$, $Cl^-$, $Br^-$, $I^-$, $SO_4^{2-}$ have been found to produce a negative shift in the bronze electrode potential but the effect was much less pronounced than that of $OH^-$. An oxygen response similar to that in 0.1M KOH was observed in 1M KCl, but it was extremely slow, and the potentials were approximately 300 mV positive with respect to those in 0.1M KOH.

In view of these observations an adsorption mechanism is postulated as follows. Although we do not intend to limit our invention in any manner by making this hypothesis, we believe that hydroxide ions are strongly adsorbed at the bronze surface in a deoxygenated system establishing a large negative potential (−1,200 mV or less). When $O_2$ molecules are introduced, they are also adsorbed at the surface, displacing the negatively charged hydroxide and resulting in a positive shift in electrode potential. A similar mechanism would also explain the $O_2$ response in KCl.

On the other hand, investigations involving voltametric studies of the $Na_xWO_3$ electrode in basic solution have demonstrated the ability to oxidize $Na_xWO_3$ at a potential close to that where oxygen reduction occurs. Consequently, the oxygen response of the $Na_xWO_3$ electrode may be the result of a mixed potential developed from the spontaneous oxidation of the $Na_xWO_3$ electrode by dissolved oxygen.

The dissolved oxygen response of tungsten bronzes other than the cubic sodium tungsten bronzes have also been investigated and results are presented in Table V.

Potentials of the specified bronze electrode vs a saturated calomel electrode were measured in nitrogen saturated and oxygen saturated pH-9.2 (0.01 M Borax) and pH-13 (0.1M KOH − 1m MEDTA) solutions. Although significant oxygen responses were observed for a tetragonal potassium tungsten bronze and for a hexagonal cesium tungsten bronze, these responses were found to be less advantageous of the cubic sodium tungsten bronzes in terms of irreproducibility, slow time response and excessive drifting. The response of several cubic sodium tungsten bronzes of varying x values are also presented in Table V for comparison.

Table V

| Crystal | X | Crystal Structure | Solution | Potential (mV) | | ΔE (mV) |
|---|---|---|---|---|---|---|
| | | | | $N_2$ | $O_2$ | |
| $WO_3$ | | | | | | |
| | ~0 | Monoclinic | pH 9.2 | −264 | −200 | 64 |
| | | | pH 13 | −142 | −135 | 7 |
| $K_xWO_3$ | | | | | | |
| K 32 A | 0.33 | Hexagonal | pH 9.2 | −500 | −440 | 60 |
| — | 0.60 | Tetragonal | do. | −212 | −2 | 210 |
| K 32 A | | | pH 13 | −476 | −463 | 13 |
| K 10 C | | | pH 13 | −273 | −273 | 0 |
| $Rb_xWO_3$ | | | | | | |
| Rb 12G | 0.32 | Hexagonal | pH 9.2 | −282 | −270 | 2 |
| Rb 21F | 0.27 | Hexagonal | do. | −282 | −265 | 17 |
| Rb 22A | ~0.3 | Hexagonal | pH 13 | 249 | 240 | 9 |
| $Cs_xWO_3$ | | | | | | |
| Cs 1D | .30 | Hexagonal | pH 9.2 | −310 | −280 | 30 |

Table V—Continued

| Crystal | X | Crystal Structure | Solution | Potential (mV) N₂ | O₂ | ΔE (mV) |
|---|---|---|---|---|---|---|
| Cs 1D | do. | do. | pH 13 | −695 | −340 | 355 |
| $Tl_xWO_3$ | | | | | | |
| Tl 6B | 0.30 | Hexagonal | pH 9.2 | −246 | −234 | 12 |
| $Li_xWO_3$ | | | | | | |
| | 0.4 | Cubic | pH 9.2 | −178 | −62 | 116 |
| | 0.1 | Orthorhombic | pH 9.2 | −174 | −112 | 62 |
| | 0.35 | Cubic | pH 13 | −509 | −399 | 110 |
| $Na_xWO_3$ | | | | | | |
| 105A | 0.4 | Tetragonal I | pH 9.2 | −225 | −125 | 100 |
| 297I | 0.095 | Tetragonal II | do. | −140 | −120 | 20 |
| 238E | 0.05 | Orthorhombic | do. | −130 | −85 | 45 |
| | 0.51 | Cubic | do. | −399 | −279 | 120 |
| | 0.70 | Cubic | do. | −403 | −290 | 113 |
| | 0.807 | Cubic | do. | −840 | −610 | 230 |
| 297I | 0.095 | Tetragonal II | pH 13 | −289 | −257 | 22 |
| 145A3 | 0.51 | Cubic | pH 13 | −1166 | −708 | 458 |
| 235E | 0.63 | Cubic | do. | −1225 | −712 | 513 |
| 277B | 0.72 | Cubic | do. | −1218 | −688 | 530 |
| 59A | 0.79 | Cubic | do. | −1225 | −714 | 511 |
| 261E | 0.91 | Cubic | do. | −1262 | −714 | 548 |

The following are operative ranges for $x$ for different elements as A in the formula $A_xWO_3$: for potassium, $x$ may vary from about 0.3 (hexagonal crystal structure) to about 0.7 (tetragonal I); for Rb, $x$ may range from about 0.2 to about 0.32 (hexagonal); for Cs, $x$ may range from about 0.2 to about 0.3 (hexagonal); for Tl, $x$ may range from about 0.2 to about 0.3 (hexagonal); for Li, $x$ may range from about 0.1 (orthorhombic) to 0.45 (cubic); and for Na, $x$ may range from about 0.05 (orthorhombic) through the tetragonal II and tetragonal I crystal structures up to about 0.9 (cubic).

Our preferred embodiments for the electrodes are: Na with $x$ ranging from about 0.4 (tetragonal I) to about 0.9 (cubic); Li with $x$ ranging from about 0.35 to about 0.40 (cubic); Cs with $x$ about 0.3 (hexagonal); and K with $x$ about 0.6 (tetragonal I). The cubic sodium tungsten bronzes have been found to be superior to all others.

In all cases, it is preferred that the pH of the sample solution be greater than about 12 for best results.

Returning now to FIG. 1, in operation, the solutions under test should be kept at a substantially constant temperature, either by keeping the apparatus at a constant ambient temperature, or as indicated, immersing the chambers 11, 15 and 18 in a temperature controlled bath. Secondly, the basic solution in the reservoir 12 should be completely free of oxygen. This may be accomplished, if desired, by bubbling nitrogen into the reservoir 12 prior to use.

For calibration, two samples of oxygen are needed, and it is suggested that air (20.9%) and a 1% oxygen, 99% $N_2$ mixture be used. Tests with these samples define the end points on the calibration curve.

The tungsten bronzes have been shown to be highly useful as indicating electrodes in the potentiometric determination of dissolved oxygen. Obvious applications are foreseen in the environmental field, resulting from the high degree of sensitivity attainable and the magnitude of the potential change per unit change of oxygen concentration. The relative ease with which potentiometric measurements can be made and the simplicity of the equipment add to the utility of measuring systems using these electrodes.

Having thus described in detail various embodiments of the present invention, persons skilled in the art will be able to modify certain of the steps and procedures which have been disclosed while continuing to practice the principle of the invention; and it is, therefore, intended that all such modifications and substitutions be covered as they are embraced within the spirit and scope of the appended claims.

We claim:

1. A method of determining the dissolved oxygen concentration in a sample solution comprising: adding a complexing agent to said sample to complex metal ions therein; contacting the sample in a basic solution with an indicator electrode having as an active element a non-stoichiometric bronze crystal responsive to dissolved oxygen in said sample; and measuring the potential of said indicator electrode, said potential being representative of the dissolved oxygen concentration in said sample.

2. The method of claim 1 wherein said electrode is a tungsten bronze crystal of the formula $A_xWO_3$ wherein A is selected from the group of sodium, potassium, lithium, rubidium, cesium and thallium and wherein $x$ is greater than zero and less than one.

3. The method of claim 1 wherein the active element of said indicator electrode is a single non-stoichiometric tungsten bronze crystal of the formula $A_xWO_3$ wherein A is selected from the group consisting of sodium with $x$ in the range of about 0.05 to about 0.9 potassium with $x$ in the range of about 0.3 to about 0.70, lithium with $x$ in the range of about 0.1 to about 0.45, rubidium with $x$ from 0.2 to 0.32, cesium with $x$ in the range of about 0.2 to about 0.3, and thallium with $x$ in the range of about 0.2 to about 0.3.

4. The method of claim 1 further comprising the step of measuring said indicator potential relative to the potential of a reference saturated calomel electrode.

5. The method of claim 1 further comprising the step of mixing a basic solution with said sample to increase the pH of said mixture to at least about 12.

6. The method of claim 5 wherein said basic solution comprises 0.1M KOH.

7. The method of claim 1 wherein said indicator electrode is a single non-stoichiometric tungsten bronze crystal of the formula $A_xWO_3$ wherein A is selected from the group consisting of sodium with $x$ in the range of about 0.4 to about 0.9; lithium with $x$ in the range of about 0.35 to about 0.4; cesium with $x$ about 0.3; and potassium with $x$ about 0.6.

* * * * *